(12) United States Patent
Gobriel et al.

(10) Patent No.: US 8,566,625 B2
(45) Date of Patent: Oct. 22, 2013

(54) SYSTEM AND METHOD FOR DETERMINING TRANSMITTING FREQUENCY TO MAINTAIN REMOTE APPLICATION SERVER CONNECTIVITY

(75) Inventors: Sameh Gobriel, Hillsboro, OR (US); Christian Maciocco, Portland, OR (US); Kristoffer Fleming, Chandler, AZ (US); Gideon Prat, Haifa (IL); Tsung-Yuan Charlie Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 303 days.

(21) Appl. No.: 13/175,778

(22) Filed: Jul. 1, 2011

(65) Prior Publication Data

US 2013/0007484 A1   Jan. 3, 2013

(51) Int. Cl.
*G06F 1/32* (2006.01)

(52) U.S. Cl.
USPC .......................... 713/320; 370/311; 370/465

(58) Field of Classification Search
USPC ................. 370/311, 465; 455/343.2; 713/320
See application file for complete search history.

(56) References Cited

U.S. PATENT DOCUMENTS

| | | | |
|---|---|---|---|
| 6,678,728 B1 | 1/2004 | Uppunda et al. | |
| 7,460,556 B2 * | 12/2008 | Duggirala et al. | 370/465 |
| 7,483,437 B1 | 1/2009 | Mohaban | |
| 8,239,698 B2 | 8/2012 | Maciocco et al. | |
| 8,307,234 B2 | 11/2012 | Gobriel et al. | |
| 8,375,134 B2 * | 2/2013 | Herzog et al. | 709/228 |
| 2007/0019610 A1 | 1/2007 | Backholm et al. | |
| 2007/0140193 A1 | 6/2007 | Dosa et al. | |
| 2008/0130560 A1 | 6/2008 | Khandekar et al. | |
| 2008/0162682 A1 | 7/2008 | Ramachandran et al. | |
| 2009/0003319 A1 | 1/2009 | Sood et al. | |
| 2009/0205038 A1 | 8/2009 | Kumar et al. | |
| 2010/0023759 A1 | 1/2010 | Langer | |
| 2010/0023788 A1 | 1/2010 | Scott et al. | |
| 2010/0039971 A1 | 2/2010 | Lor et al. | |
| 2010/0058082 A1 | 3/2010 | Locker et al. | |
| 2010/0069127 A1 | 3/2010 | Fiennes | |
| 2010/0174808 A1 | 7/2010 | Dabagh et al. | |
| 2010/0322124 A1 | 12/2010 | Luoma et al. | |
| 2012/0005501 A1 | 1/2012 | Maciocco et al. | |
| 2012/0117401 A1 | 5/2012 | Gobriel et al. | |

OTHER PUBLICATIONS

Non Final Office Action Received for the U.S. Appl. No. 13/350,760, mailed on Feb. 28, 2012, 12 pages.

(Continued)

*Primary Examiner* — Albert Wang
(74) *Attorney, Agent, or Firm* — Grossman, Tucker, Perreault & Pflger, PLLC

(57) ABSTRACT

A system and method for maintaining connectivity between a host system running an Always-On-Always-Connected (AOAC) application and an associated remote application server includes determining a timing interval Ti for sending keep-alive messages. The timing interval Ti may be determined by selecting a value for a timeout (Ti) to a value between a maximum timeout ($T_{max}$) and a minimum timeout ($T_{min}$), transmitting a keep-alive message, at an interval based on Ti, across a network connection between a client platform running an Always-On-Always-Connected (AOAC) application and a remote application server associated with the AOAC application, checking a status of the network connection, increasing the value for $T_{min}$ if the network connection is still active and decreasing the value for $T_{max}$ if the network connection has been dropped.

22 Claims, 13 Drawing Sheets

(56) References Cited

OTHER PUBLICATIONS

Notice of Allowance Received for the U.S. Appl. No. 13/350,760, mailed on Jul. 10, 2012, 5 pages.
International Search Report and Written Opinion from related PCT/US12/045135 mailed Nov. 30, 2012, 9 pages.
International Search Report and Written Opinion from related PCT/US12/045125 mailed Dec. 10, 2012.
Non Final Office Action Received for the U.S. Appl. No. 13/175,757, mailed on Nov. 28, 2011, 10 pages.
Notice of Allowance Received for the U.S. Appl. No. 13/175,757, mailed on Apr. 9, 2012, 9 pages.
Non Final Office Action used for the U.S. Appl. No. 13/341,064, mailed on Jun. 29, 2012, 12 pages.

* cited by examiner

SYSTEM AND METHOD FOR DETERMINING TRANSMITTING FREQUENCY TO MAINTAIN REMOTE APPLICATION SERVER CONNECTIVITY

CROSS-REFERENCE TO RELATED APPLICATION

This application is related to U.S. patent application Ser. No. 13/175,757, entitled System and Method for Maintaining Connectivity to Remote Application Servers, filed simultaneously with the instant application.

FIELD

The present disclosure relates to wireless/wired communications, and, more particularly, to energy efficient Ethernet using active/standby toggling.

BACKGROUND

To reduce power consumption (and extend battery life), portable wireless devices (such as, but not limited to, laptops, netbooks, tablet computers, and the like) may toggle between an active-power state (for example the S0 state according to the Advanced Configuration and Power Interface (ACPI) specification) and a low-power state (also known as a standby mode, sleep mode, suspend mode, or the like). When switched to the low-power state (also known as S3 mode according to the ACPI specification), power consumption is reduced by reducing and/or eliminating power to all unneeded portions of the platform and devices. In many situations it is desirable for one or more applications/services executing on the portable wireless device to maintain connectivity and presence so that the platform or end-user can always be reached.

One approach to maintain connection and presence with an application server involves periodically transitioning the platform from the standby mode to the active mode so that the platform may transmit presence data to the application server and/or receive any other data. Unfortunately, this approach requires a significant amount of energy as the entire platform is toggled between standby and active modes. Additionally, the periodic toggling between standby and active modes may have a negative impact on reliability of the standby-to-active transition. While technologies such as Wake on Wireless LAN (WoWLAN) have low power consumption, WoWLAN only maintains the data link (L2 link layer) connectivity to the local access point. As such, WoWLAN cannot maintain connectivity and presence to an application server.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Generally, this disclosure describes an energy-efficient wireless or wired communications approach that enables a platform and applications/services (e.g., Always-On-Always-Connected (AOAC) applications) to maintain connectivity and presence to a network and remote application servers while the platform is, and stays in, a low-power state. In at least one embodiment described herein, AOAC applications/services desiring to maintain connectivity and presence to the network and remote application servers initiate the building of a list of keep-alive messages before the platform transitions into a low-power state (e.g., from an active power state) to reduce power consumption (e.g., to preserve battery life). The keep-alive messages (which may include a respective application/service proprietary protocol, sequence number, timing information, and/or application/service key or token) are periodically transmitted by a communication device (e.g., a wireless or wired Network Interface Card (NIC) and/or an integrated wireless/wired controller) of the platform to the appropriate address after the platform transitions into the low-power state. As the communication device of the platform is able to issue the keep-alive messages while the platform remains in the low-power state, connectivity and presence to the network and/or remote application servers is maintained in an energy efficient manner.

As used herein, the term "active power state" refers to a platform functioning in a working or fully operational state. An example of an active power state includes the S0 state as defined by the Advanced Configuration and Power Interface (ACPI) specification. Another example includes, but is not limited to, the Full On power state. As used herein, the term "low-power state" refers to a platform functioning in a reduced power state in which power to devices that do not indicate they must remain on may be powered down and one or more central processing units (CPUs) stop executing instructions (e.g., are powered down). Examples of low-power power states include the S1, S2, S3, and/or S4 states as defined by the ACPI specification. Further examples of low-power states are also known as a standby mode, sleep mode, suspend mode, or the like.

Figure 1:
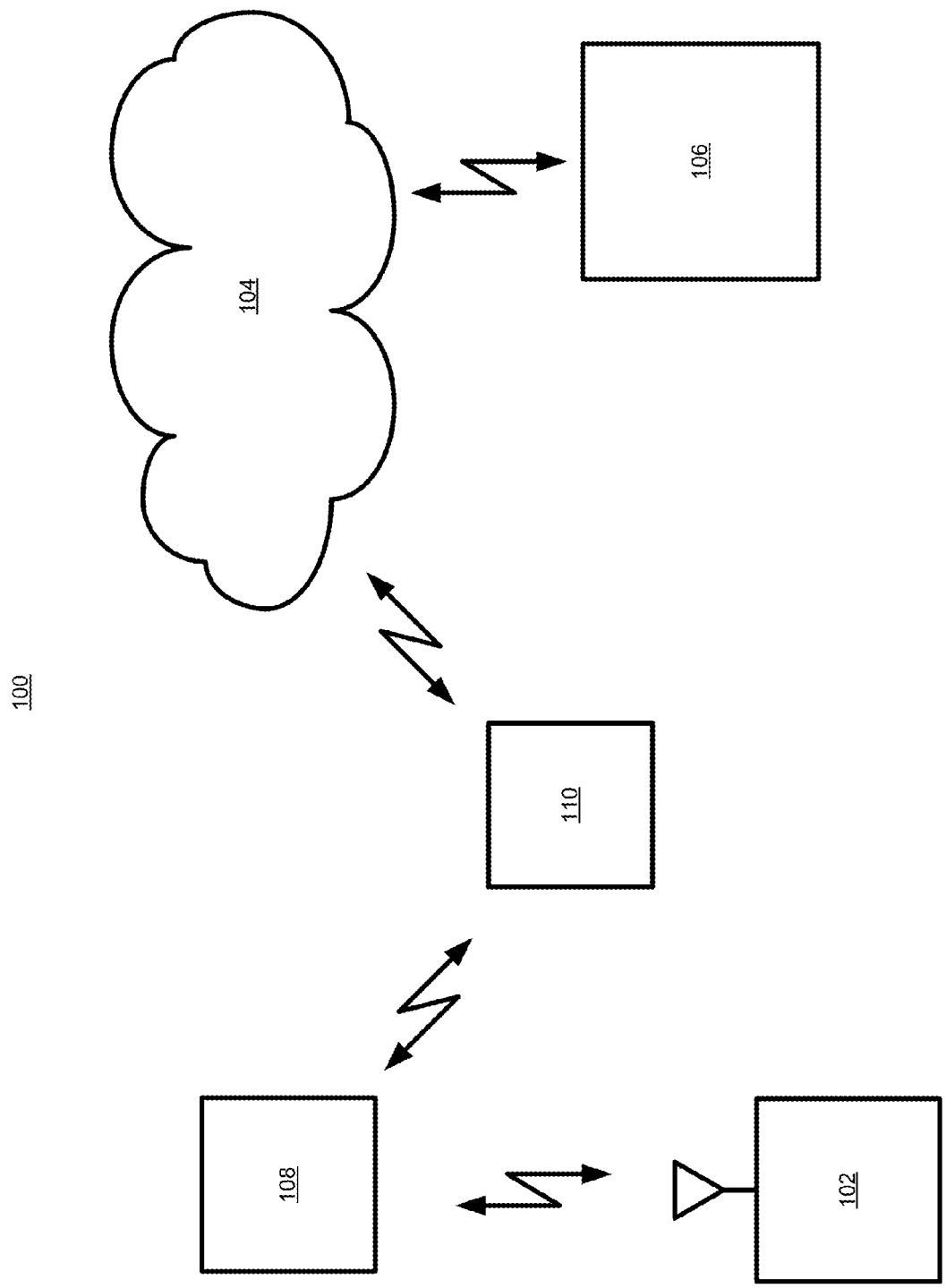
FIG. 1 illustrates one embodiment of a communication system between a client platform and a remote application server consistent with the present disclosure.

Turning now to FIG. 1, one embodiment of a communication system 100 is generally illustrated. The communication system 100 includes one or more client platforms 102 configured to establish a wireless or wired communication link across the network 104 with one or more remote application servers 106. The client platform 102 may include a desktop, a laptop, and/or a mobile computing device. Examples of mobile computing devices include, but are not limited to, a smart phone (such as, but not limited to, a Blackberry™ smart phone, an iPhone™ smart phone, an Android™ smart phone, and the like), a tablet computer (such as, but not limited to, an iPad™ tablet computer, PC-based tablet computers, and/or current or future tablet computers offered by Intel™ Corporation), and ultra-mobile personal computers.

The client platform 102 may be configured to establish a communication link with one or more network access points/bridges 108 and/or other communication devices 110 (such as, but not limited to, Network Address Translation (NAT) devices) in the communication pathway/link between the client platform 102 and the remote application server 106. For example, the client platform 102 can use signals to communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGmS-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e, 802.11ah standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

Figure 2:
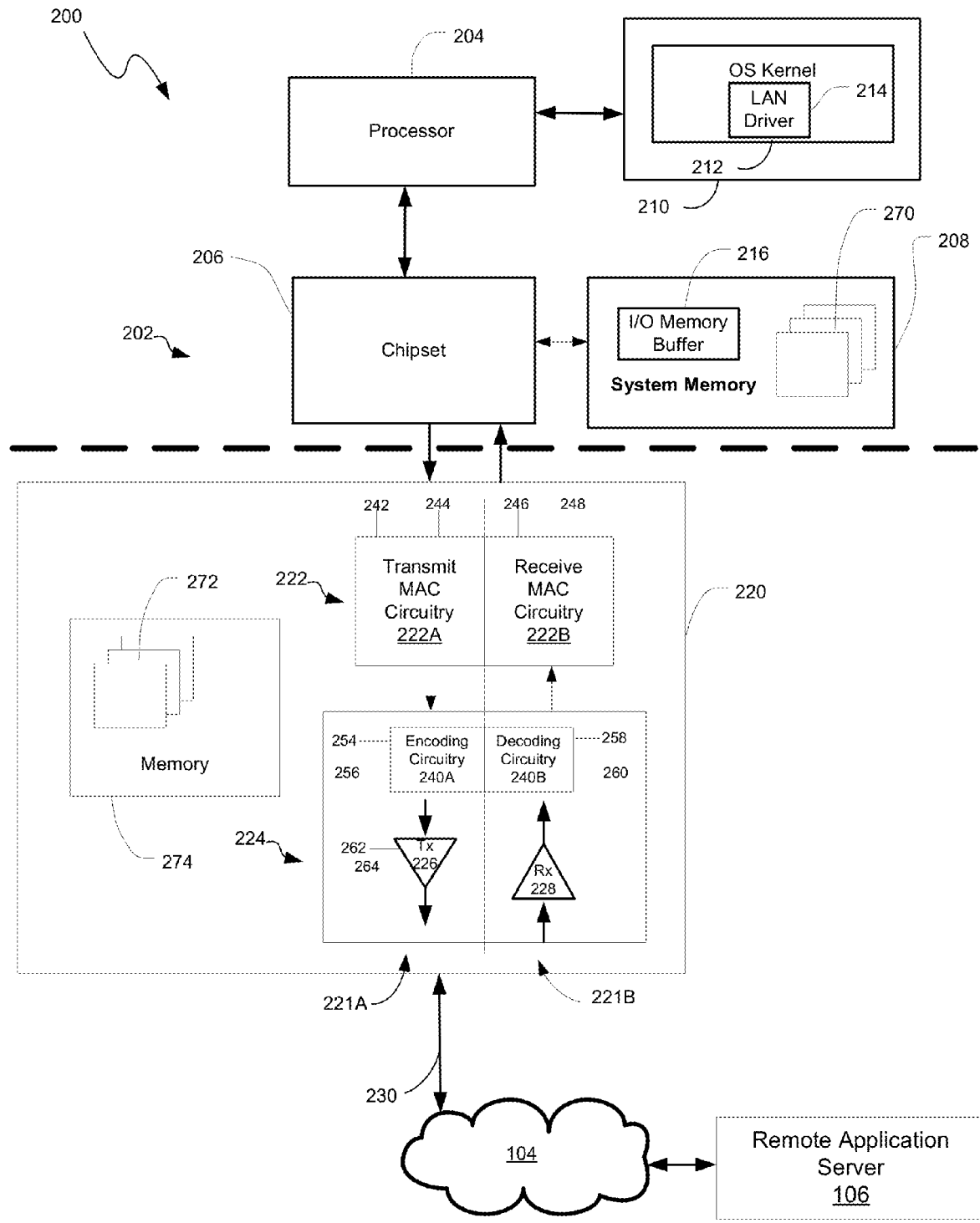
FIG. 2 illustrates one embodiment of a client platform consistent with the present disclosure.

Turning now to FIG. 2, one embodiment of the client platform 200 consistent with the present disclosure is generally illustrated. The client platform 200 includes a host system 202 and a NIC 220. The host system 202 may include a host processor 204, chipset circuitry 206 and system memory 208. The host processor 204 may include one or more processor cores and may be configured to execute system software 210. System software 210 may include, for example, operating system code 212 (e.g., OS kernel code) and wireless and/or wired driver code 214 (such as, but not limited to, a local area network (LAN)). LAN driver code 214 may be configured to control, at least in part, the operation of the NIC 220 operation, as will be described in greater detail below. System memory 208 may include I/O memory buffers 216 configured to store one or more data packets that are to be transmitted by, or received by, NIC 220. Chipset circuitry 206 may generally include "North Bridge" circuitry (not shown) to control communication between the processor 204, NIC 220 and system memory 208. Also, chipset circuitry 206 may include circuitry (not shown) to control I/O communications between the host system 202 and the NIC 220.

NIC 220 may be logically and/or physically divided into a transmit path 221A and a receive path 221B. The NIC 220 may generally include Ethernet media access control (MAC) circuitry 222 and physical interface (PHY) circuitry 224. MAC circuitry 222 may include transmit MAC circuitry 222A configured to assemble data to be transmitted into frames, or packets, that include destination and source addresses along with network control information and error detection hash values. MAC circuitry 222 may also include receive MAC circuitry 222B configured to remove data from received frames and place the data in system memory 208. PHY circuitry 224 may include encoding circuitry 240A configured to encode data packets and decoding circuitry 240B configured to decode data packets. Encoding circuitry 240A and decoding circuitry 240B may collectively be embodied as a processor (for example, a digital signal processor) configured to perform analog-to-digital and digital-to-analog conversion, encoding and decoding of data, analog parasitic cancellation (for example, cross talk cancellation), and recovery of received data. PHY circuitry 224 may also include transmit (Tx) circuitry 226 configured to transmit one or more data packets and receive (Rx) circuitry 228 configured to receive one or more data packets. Rx circuitry 228 may include phase lock loop circuitry (PLL, not shown) configured to coordinate timing of data reception. The PHY circuitry 224 may be configured to establish an Ethernet communications link 230 for transmitting and receiving data (e.g., packets) either wirelessly and/or over a media dependent interface (which may include, for example Category 6 (Cat6) Ethernet cable).

Transmit MAC circuitry 222A may include a controllable clock input 242 and a controllable power input 244. Clock input 242 may generally include a clock signal that controls the clocking of the MAC circuitry 222A. Power input 244 may generally include a power supply signal to supply power to one or more components of the MAC circuitry 222A. Similarly, Receive MAC circuitry 222B may include a controllable clock input 246 and a controllable power input 248. Clock input 246 may generally include a clock signal that controls the clocking of the MAC circuitry 222B. Power input 248 may generally include a power supply signal to supply power to one or more components of the MAC circuitry 222B. Encoding circuitry 240A may include a controllable clock input 254 and a controllable power input 256, and decoding circuitry 240B may include a controllable clock input 258 and a controllable power input 260. Transmit circuitry 226 may include a controllable clock input 262 and a controllable power input 264. In one embodiment, clocking of the transmit path 221A and receive path 221B may be independently controlled. Also, in one embodiment, the power of transmit path 221A and receive path 221B may be independently controlled.

The NIC 220 may be configured to exchange commands and data with a remote application servers 106, via one or access points/bridges (which may include a switch, bridge, router and/or other NIC which may be associated with a host system similar to host system 202, not shown in FIG. 2) and/or remote application server 106. Remote application server 106 may include any device that is configured to communicate with the NIC 220 using a wireless or wired communications protocol to maintain an AOAC application executing on client platform 200.

Although other power states are also possible, the client platform 200 is configured to operate in at least an active power state mode and a low-power state. In the active-power state, the host system 202 and the NIC 220 are generally fully functional. When the client platform 200 is operating in the low-power state, power may generally be turned off to the host system 202, and just the NIC 220 may remain functional.

Prior to switching from a first power state (e.g., the active power state or an intermediary or secondary-power state between the active power state and the low-power state as described herein) to the low-power state, the client platform 200 is configured to initiate the building of a list or set of keep-alive messages 272 for one or more AOAC applications/services 270 (e.g., applications 270 stored in memory 208) executing on the host system 202 that desire to maintain connectivity and presence to the network and application servers. For example, the AOAC applications/services 270 may initiate the building of the keep-alive messages 272 immediately prior to the client platform 200 transitioning to the low-power state, for example, upon activation of a function key or any other means such as, but not limited to, a predefined timeout period. The keep-alive messages 272 are configured to maintain connectivity and presence with the remote application servers. For example, the keep-alive messages 272 may be configured to maintain the L2 connectivity (for example, to support WoWLAN). The offloaded protocols may also be configured to maintain the platform L3 (IP) address (e.g., Address Resolution Protocol (ARP), Dynamic Host Configuration Protocol (DHCP) leases, and Internet Control Message Protocol (ICMP)).

The specific format of each of the keep-alive messages 272 will therefore depend on the specific AOAC application as well as the transmission protocols used to communicate between the client platform 200 and the remote application servers. For example, the keep-alive messages 272 may be generated based on a respective AOAC application/service proprietary protocol and may include appropriate sequencing information and timing (if required) and may be secured with the application/service key/tokens (if required).

The set of keep-alive messages 272 (or at least a portion thereof) may be stored in memory 274. Memory 274 may be located anywhere on the client platform 200 that is accessible by the NIC 220 while the client platform 200 is (and remains) in the low-power state. For example, memory 274 may be part of the NIC 220; however, this is only an example and the memory 274 storing the set of keep-alive messages 272 may be located anywhere in the client platform 200.

Once the client platform 200 transitions into the low-power state, the NIC 220 may be configured to periodically transmit at least one data packet to the remote application server 106 containing a keep-alive message 272. For example, according to one embodiment, the transmit MAC circuitry 222A is configured to receive an AOAC command from a device driver operating on the host system 202. In response to the AOAC command, the transmit MAC circuitry 222A and at least the Tx circuitry 226 are configured to periodically transmit data packets including the keep-alive messages 272 to the remote application server 106. The keep-alive message 272 may be periodically transmitted based on one or more clock signals/inputs 242, 246, 254, 258, and/or 262 associated with the NIC 220. The frequency in which the keep-alive messages 272 may be transmitted by the NIC 220 may be the same or different for each of a plurality of AOAC applications 270. Additionally, the frequency in which the NIC 220 transmits the keep-alive messages 270 may be constant or may change over time.

For example, when there are multiple AOAC applications 270 on the client platform 200, the client platform 200 (e.g., but not limited to, the NIC 220) may determine the minimum time or frequency ($T_{app}$) required for each AOAC application 270 in order to maintain connectivity and presence with the remote servers. The client platform 200 may then compare each of the minimum times $T_{app}$ to determine the smallest $T_{app}$ of all of the AOAC application 270 (i.e., $T_{min}$). The NIC 220 may then transmit the keep-alive messages 272 for all of the AOAC applications 270 based on $T_{min}$. Transmitting the keep-alive messages 272 based on $T_{min}$ for all of the AOAC applications 270 may further reduce power consumption of the client platform 200 while in the low-power state. In particular, the NIC 220 generally consumes more power while transmitting packets than when not transmitting. As such, transmitting the keep-alive messages 272 based on $T_{min}$ for all of the AOAC applications 270 may further reduce power consumption of the client platform 200 by allowing the NIC 220 to transmit multiple keep-alive messages 272 during a single time period and therefore minimizing the amount of time that the NIC 220 spends transmitting packets.

When all of the keep-alive messages 272 in the memory 274 have been transmitted by the NIC 220, the NIC 220 maybe configured to transition the client platform 200 from the low-power state to the active power state (or an intermediary power state between the low-power state and the active-power state) to generate additional keep-alive messages 272 in memory 274. Once the memory 274 has been replenished with additional keep-alive messages 272, the client platform 200 may transition back to the low-power state and the NIC 220 may resume periodically transmitting the keep-alive messages 272 as described herein.

According to another embodiment, the client platform 200 may reduce the storage required to maintain connectivity and presence while client platform 200 is in the low-power state. In particular, the client platform 200 may be configured to generate a general keep-alive message with a list of security tokens for a predefined period of time. The general keep-alive messages and the list of security tokens may then be transferred to the NIC 220 before the client platform 200 transitions in the low-power state. Additionally, information about each keep-alive message (such as the minimum required periodicity to maintain presence/connectivity, the destination address for the keep-alive message, etc.) may also be transferred to the NIC 220. Upon transitioning to the low-power state, the NIC 220 may recover the general keep-alive messages and the list of security tokens, and update the pre-built general keep-alive messages with the security token from the list and sequencing information (along with the destination address). The NIC 220 may then transmit the keep-alive message 272 at the appropriate time intervals to maintain the application/service presence to the network in a secure fashion as to preserve itself against various attacks. Accordingly, the amount of storage required may be reduced since the general keep-alive message and the list of security tokens is generally much smaller than the list of completely pre-built keep-alive messages 272. For example, storing ten fully pre-build keep-alive messages of 200 bytes each would require 2000 bytes of storage while using a general keep-alive message of 200 bytes and a list of security token for each message to be generated would require less than 400 bytes for example.

The client platform 200 (e.g., the NIC 220) may also be configured to support more extensive wake patterns than the one defined for WoWLAN. For example, the NIC 220 may be configured to wake up all or a portion of the client platform 200 upon receiving an incoming internet packet, for example, from specific internet based applications such as applications/services executing on one or more remote application servers. The wake up patterns may include, but are not limited to, a TCP (Transport Control Protocol) SYN message, an HTTP or HTTPS message or any application specific message.

The NIC 220 may also be configured to optionally receive at least one data packet from the remote application servers 106. In one embodiment, to transition into the low-power state from the active data transmission power state, the NIC 220 may be configured to control the clock input 242, 254 and/or 262. For example, the NIC 220 may be configured to control the clock input 246 and/or 258 and the clock inputs 242, 254, 262, 246 and/or 258 may be gated (clock gating) to turn the clock signal OFF to the corresponding circuitry.

Figure 3:
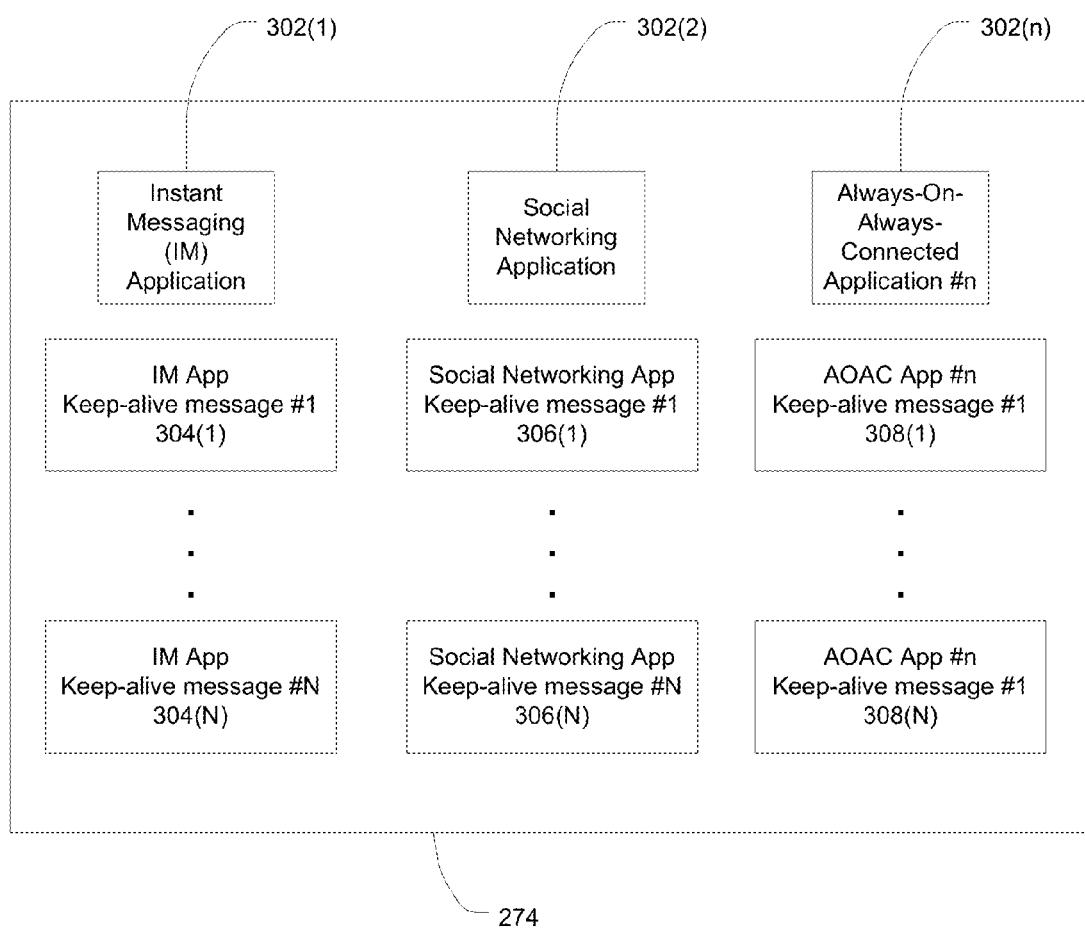
FIG. 3 depicts one embodiment of a list of keep-alive messages stored in memory consistent with the present disclosure.
Figure 4:
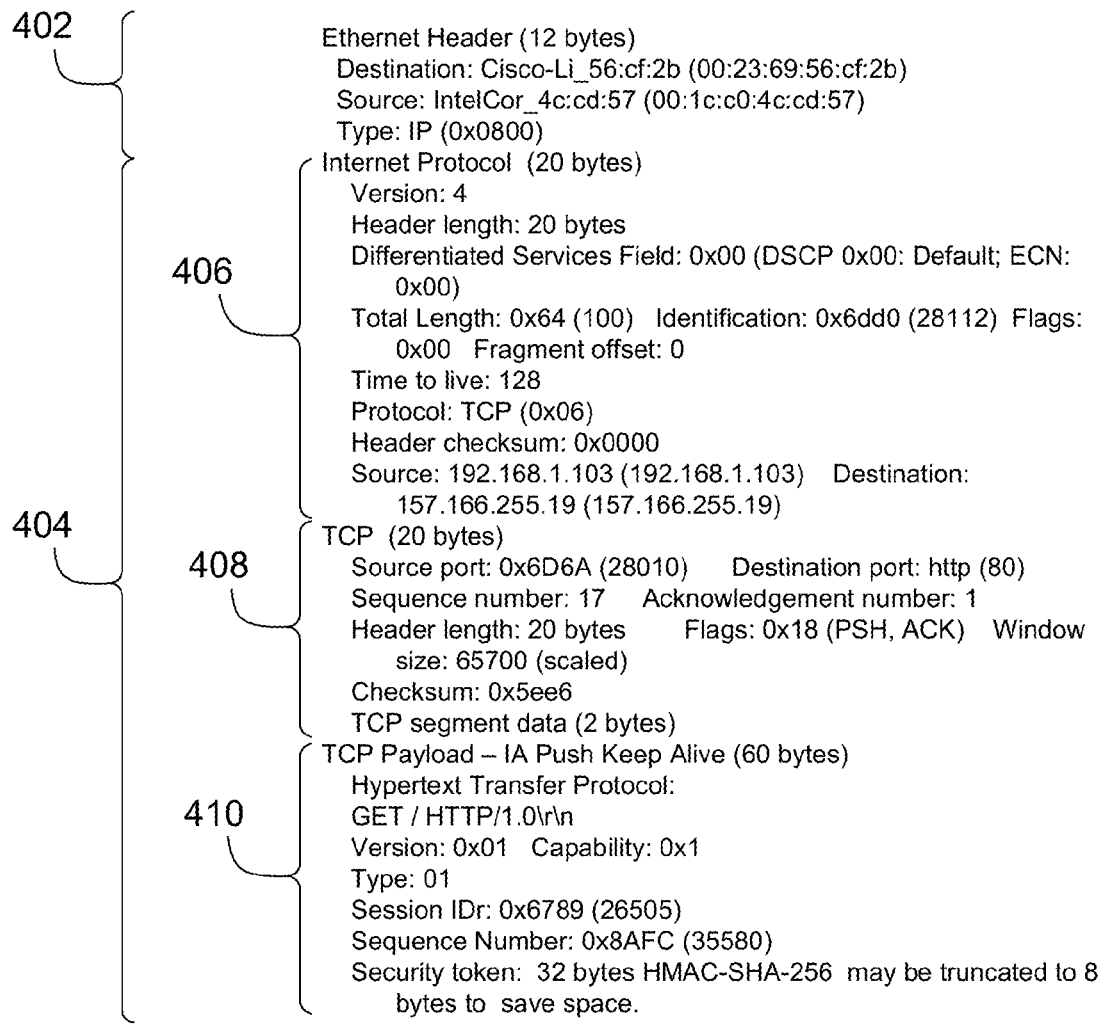
FIG. 4 depicts one embodiment of a keep-alive message packet consistent with the present disclosure.

One embodiment illustrating a list 300 of a plurality of keep-alive messages stored in memory 274 for a plurality of AOAC applications 302(1)-(n), is generally illustrated in FIG. 3. For example, AOAC applications 302(1)-(n) may include an instant messaging (IM) application 302(1) (such as, but not limited to, Microsoft Instant Messaging™, AOL Instant Messenger™, Mobile Instant Messaging (MIM), or the like), a social networking application 302(2) (such as, but not limited to, Facebook™, Twitter™, MySpace™, or the like), and/or any other AOAC application 302(n). Each AOAC application 302(1)-(n) may include a plurality of associated keep-alive messages 304(1)-(N), 306(1)-(N), and 308(1)-(N) based on a respective application/service proprietary protocol, sequence number, timing information, and/or application/service key or token. One embodiment of a keep-alive packet 400 consistent with the present disclosure is generally illustrated in FIG. 4. For example, the keep-alive packet 400 may comprise a header 402 and a payload 404 compatible with a TCP/IP based protocol. The header 402 may contain destination and source MAC addresses. The payload 404 may contain Internet Protocol header segment 406, a TCP segment 408, and a TCP payload segment 410 as generally illustrated.

Figure 5:
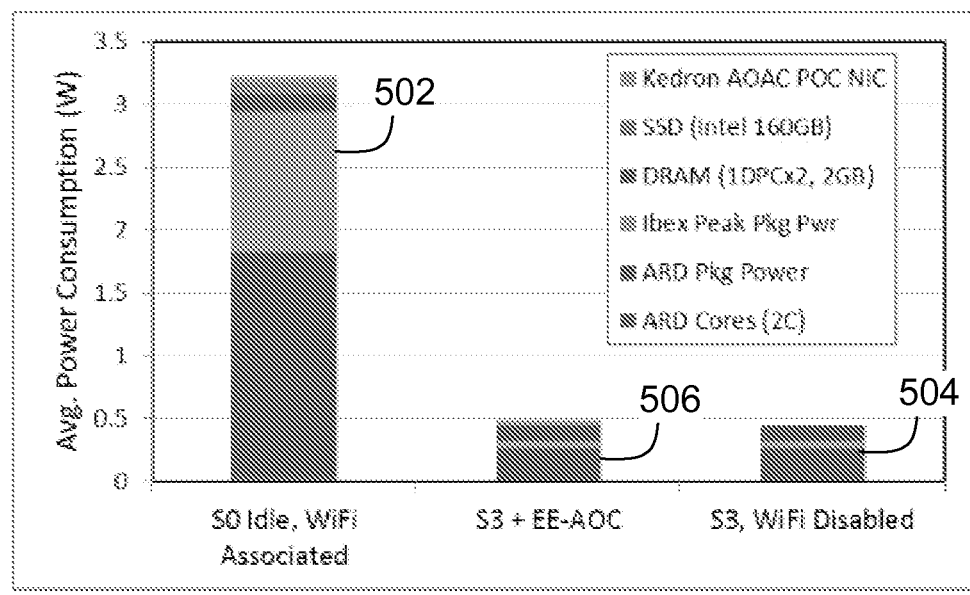
FIG. 5 depicts a power profile chart illustrating the average power consumption of a host system operating in various states.

Turning now to FIG. 5, a chart 500 is provided which illustrates one example of the average power consumption (W) by a client platform in various modes (e.g., modes 502, 504, and 506). As can be seen, the client platform and NIC 220 consume approximately 3.25 W while operating in the active-power state (e.g., SO Idle) with WiFi active (502) and consumes approximately 0.4 W while in the low-power state (e.g., S3) with WiFi disabled (504). As may be appreciated, the S3 state (504) has the WiFi disabled and therefore cannot maintain network connectivity and/or presence. The S3 state (504) is believed to represent the minimum power that the NIC 220 can consume without the platform being shut down completely. In contrast, the NIC 220 operating in the low-power state (e.g., S3) utilizing the AOAC method of the present disclosure only consumes approximately 0.5 W (506). As such, the NIC 220 in the AOAC mode (506) of the present disclosure only consumes approximately 0.1 W more than the S3 mode (504), while still maintaining network connectivity and presence.

Figure 6:
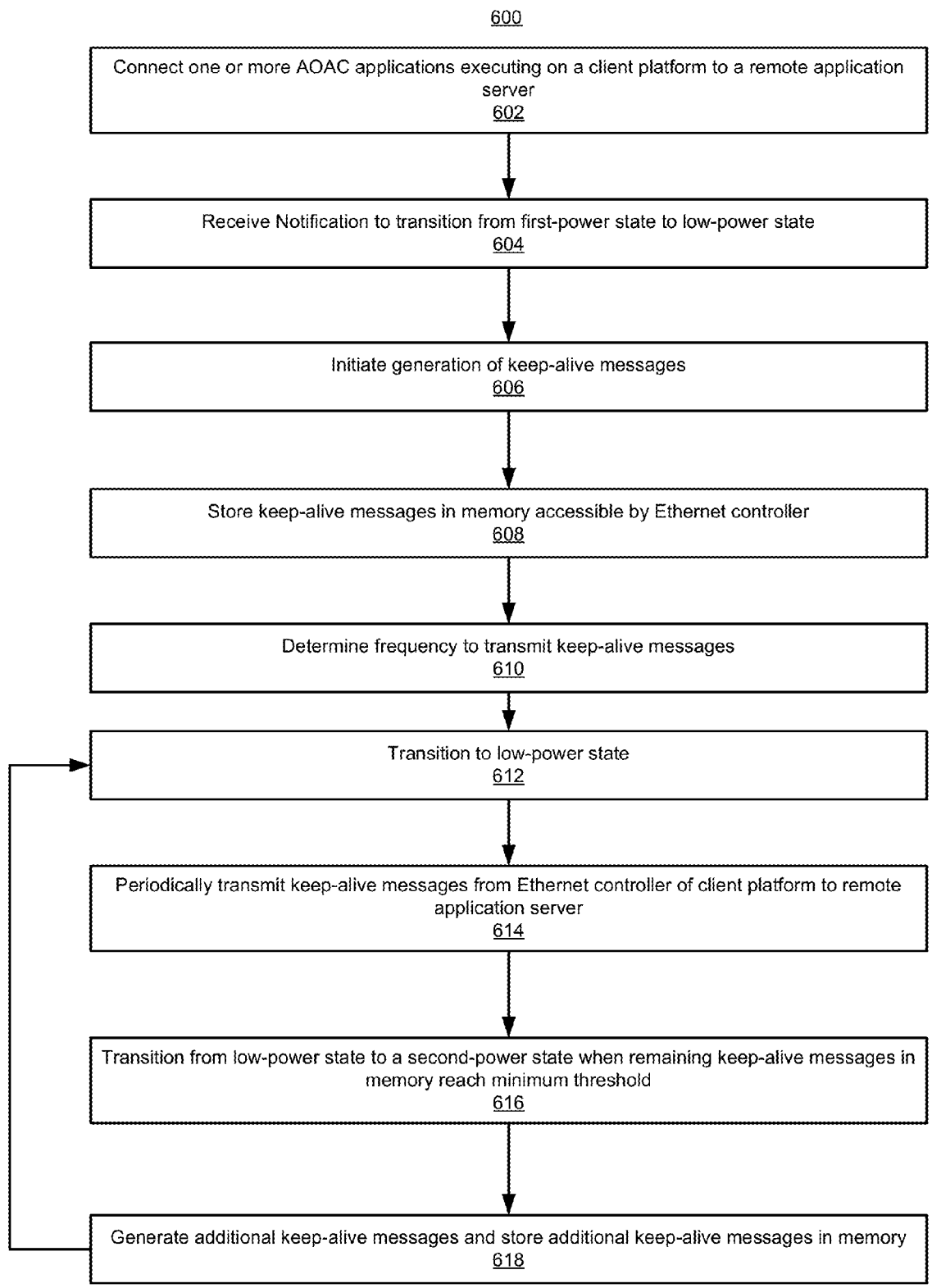
FIG. 6 illustrates one embodiment of a flowchart of operations consistent with the present disclosure.

Turning now to FIG. 6, one embodiment illustrating a flowchart 600 of operations to establish and/or maintain connectivity and presence with a remote application server is provided. For example, one or more AOAC applications executing on the client platform are connected to a remote application server (operation 602). The client platform is operating in a first-power state (e.g., an active-power state). The client platform then receives a notification to transition from the first-power state to a low-power state (operation 604). The notification may be user-generated (e.g., closing the lid on a laptop or activating a low-power state function) and/or automatic (e.g., the client platform may automatically transition to the low-power state after a predetermined period of inactivity). Prior to transitioning to the low-power state, the client platform initiates the generation of the keep-alive messages (operation 606). The keep-alive messages may be generated prior to, or after, notification to transition to the low-power state. As described herein, the entire keep-alive messages may be generated (e.g., the completely pre-built keep-alive messages) or a portion of the keep-alive messages may be generated (e.g., a general keep-alive message and a list of security tokens). The keep-alive messages (or portions thereof) may be stored in memory which is accessible to the NIC while the client platform is in the low-power state (operation 608). Optionally, the client platform determines the frequency to transmit the keep-alive messages, for example, when multiple AOAC applications are executing on the client platform (operation 610).

The client platform may then transition to the low-power state (operation 612). Once the client platform in operating in the low-power state, the NIC may begin periodically transmitting the keep-alive messages to the remote application server (operation 614). The NIC may continue to transmit the keep-alive messages until the client platform transition from the low-power state (e.g., due to a packet received by the NIC or a user-initiated transition). Alternatively, the NIC may continue to transmit the keep-alive messages until the remaining number of keep-alive messages stored in the memory reaches a minimum threshold. Once the minimum threshold has been reached, the client platform transitions from the low-power state to a second-power state (operation 616). The client platform then initiates generating additional keep-alive messages and stores them in the memory (operation 618). The second-power state may be the active-power state or an intermediary power state sufficient to allow the client platform to generate additional keep-alive messages. The minimum threshold may be selected to allow the client platform sufficient time to generate additional keep-alive messages while still maintaining connectivity and presence with the remote application server. After the additional keep-alive messages have been generated/stored, the client platform transitions back to the low-power state (operation 612) and resumes periodically transmitting the keep-alive messages as described herein.

Figure 7:
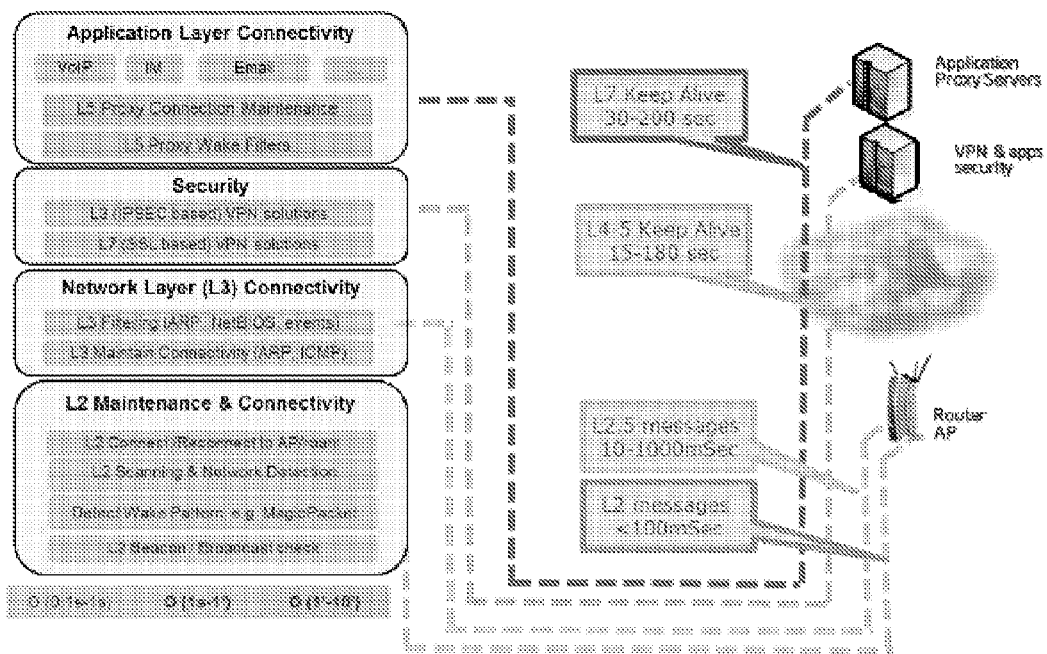
FIG. 7 illustrates one embodiment of the various stack layers.

As explained herein, the client platform 102, FIG. 1, may maintain connectivity and presence to the network 104 and one or more remote application servers 106 when the client platform 102 is in a low-power state by periodically transmitting keep-alive messages to the appropriate address (e.g., the application server 106). As discussed herein, the keep-alive messages may be generated based on a respective application/service proprietary protocol, sequence number, timing information, and/or application/service key or token. To operate in accordance with the protocols and/or standards described herein, the keep-alive messages may implement some of the communication system layers. FIG. 7 illustrates at a high level a keep-alive message 700 and its associated frequency of the various layers of a network stack. For example, the keep-alive message 700 consistent with at least one embodiment of the present disclosure may target the data/link layer message (such as, but not limited to, 802.11 MAC layer (i.e., OSI Data/Link Layer 2)) and applications/services layer messages (such as, but not limited to, OSI Session Layer 5, OSI Presentation layer 6, and OSI Application Layer 7)); however, it should be understood that a keep-alive message consistent with the present disclosure is also applicable to messages at any layer.

The Data/Link Layer 2 provides the functional and procedural means to transfer data between network entities and to detect and possibly correct errors that may occur in the Physical Layer. The Session Layer 5 controls the dialogues (connections) between computers. It establishes, manages and terminates the connections between the local and remote application. It provides for full-duplex, half-duplex, or simplex operation, and establishes checkpointing, adjournment, termination, and restart procedures. The Session Layer is commonly implemented explicitly in application environments that use remote procedure calls in which the client platform 102 sends a request message to a known remote application server 106 to execute a specified procedure with supplied parameters. The remote application server 106 sends a response to the client platform 102, and the application continues its process. The Presentation Layer 6 establishes context between Application Layer entities, in which the higher-layer entities may use different syntax and semantics if the presentation service provides a mapping between them. If a mapping is available, presentation service data units are encapsulated into session protocol data units, and passed down the stack. The Presentation Layer 6 provides independence from data representation (e.g., encryption) by translating between application and network formats. The Application Layer 7 interacts with software applications that implement a communicating component. Application Layer 7 functions may include identifying communication partners, determining resource availability, and synchronizing communication.

NIC 220 may also include I/O link or bus circuitry (not shown) to provide I/O communications between the NIC 220 and the chipset circuitry 206 (such link or bus circuitry may comply with the aforementioned PCI-Express communications protocol). NIC may also include MAC/PHY interface circuitry (not shown) configured to provide I/O communications between the MAC circuitry 220 and the PHY circuitry 224 (which may include, for example SGMII or XAUI).

Memory 208 and/or memory 274 associated with the NIC 220 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory 208 and/or memory 274 associated with the NIC 220 may comprise other and/or later-developed types of computer-readable memory. Embodiments of the methods described herein may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The wireless or wired communications protocol, described herein, may be capable permitting communication using a Transmission Control Protocol/Internet Protocol (TCP/IP). The wireless or wired protocol may comply or be compatible with the Ethernet standard published by the Institute of Electrical and Electronics Engineers (IEEE) titled "IEEE 802.3 Standard", published in March, 2002 and/or later versions of this standard such as, but not limited to, "IEEE 802.11 Standard".

As used herein, a "PHY" may be defined as an object and/or circuitry used to interface to one or more devices, and such object and/or circuitry may be defined by one or more of the communication protocols set forth herein. The PHY may comprise a physical PHY comprising transceiver circuitry to interface to the applicable communication link. The PHY may alternately and/or additionally comprise a virtual PHY to interface to another virtual PHY or to a physical PHY. PHY circuitry 224 may comply or be compatible with, the aforementioned IEEE 802.3 and/or 802.11 communications protocols, and/or PHY circuitry that is compliant with an after-developed communications protocol.

Referring back to FIG. 1, the client platform 102 is configured to periodically transmit keep-alive messages to the remote application server 106 in order to maintain connectivity and presence with the remote server 106. According to one embodiment, the present disclosure features a method for improving the frequency for transmitting the keep-alive messages. The present disclosure may feature adaptive rate controlling to guarantee the connectivity between the client platform 102 and remote application servers 106 and may also feature a traffic shaping scheme to coalesce keep-alive messages to improve energy efficiency by maximizing the time for the client platform 102 to stay in a low-power state.

The present disclosure may maintain connectivity between the client platform 102 and remote application servers 106, even with the presence of various communication equipment 110 (such as, but not limited to, Network Address Translation (NAT) boxes or the like) in the communication path between the client platform 102 and the remote application server 106. In particular, if the keep-alive messages are not transmitted at a correct frequency, a NAT device 110 may time-out in the network thereby dropping the connection between the client platform 102 and the remote application server 106, even if the client platform 102 and the remote application server 106 are exchanging keep-alive messages at their default configuration rate. This problem may occur, for example, when the NAT time-out frequency is less than the remote application server time-out frequency. This problem is particularly problematic because the NAT time-out may be a configuration parameter beyond the control of the application.

According to one aspect, as described herein the present disclosure may dynamically determine what current connection timeouts and send the keep-alive messages before any connection between the client platform 102 and the remote application server 106 is dropped; and align nearby keep-alive messages from multiple AOAC applications on the client platform 102 to be sent in one burst to increase energy efficiency, instead of waking up to send keep-alive messages associated with each AOAC application independently.

With continued reference to FIG. 1, a connection between the client platform 102 and a remote application server 106 is established and maintained for a timeout of "T" seconds, after which if no data is exchanged, the connection will be dropped and the client platform 102 will no longer by reachable by the remote application server 106 (i.e., the remote application server 106 marks the client platform as "offline."). The maximum value of T is the minimum of $\{T_S, T_N\}$, wherein $T_S$ represents the minimum timeout of the remote application server 106 and $T_N$ represents the minimum timeout of any communication equipment 110 (e.g., NAT box) between the client platform 102 and the remote application server 106. For example, TCP session timeout may be 2 hours, IM offline indication may be approximately 5 minutes, and NAT timeouts may range from 15 seconds to 1 hour.

Due to the variability in the connection timeouts and the unpredictability of the network path between the client platform 102 and the remote application server 106, the AOAC application may generally default to small timeouts frequency periods, for example, in the range of about tens of second, in order to ensure that the connection is maintained. As may be appreciated, however, this default frequency period is not optimal and is not energy efficient. Moreover, this default frequency period may reduce the amount of time that the client platform 102 may remain in the low-power state because the small default frequency will consume a large number of keep-alive messages very quickly. By increasing the keep-alive frequency from this default frequency, the client platform 102 may remain in the low-power state for a longer period of time, and may also increase the overall energy efficiency of the client platform 102.

Operations of the client platform 102 to determine the optimum (or near optimum) keep-alive frequency, in conjunction with other features of the systems of FIG. 1 and FIG. 2, are described below:

(1) Dynamic Connection Timeout Discovery:

(a) Dynamic Binary Search Algorithm to Determine Timeout

At run time the client platform 102 (i.e., a state other than the low-power state such as, but not limited, the active power state S0 state as defined by ACPI) infers both $T_S$ and $T_N$. As described herein, $T_S$ can be inferred by monitoring the connection state with the server and $T_N$ can be inferred by monitoring the server reachability. The keep-alive period may be set to the minimum of the two values, Min($T_S$, $T_N$).

The present disclosure will first describe how to adaptively determine a general timeout Ti using a binary search methodology. The present disclosure will then describe how this methodology is applied to determine both $T_S$ and $T_N$, which may only differ in the conditions of the methodology. It should be appreciated that the binary search methodology described herein is for example only because of its compelling convergence time (i.e. logarithmic run time); however, other search methodologies can be used to locate the value of Ti.

Figure 8:
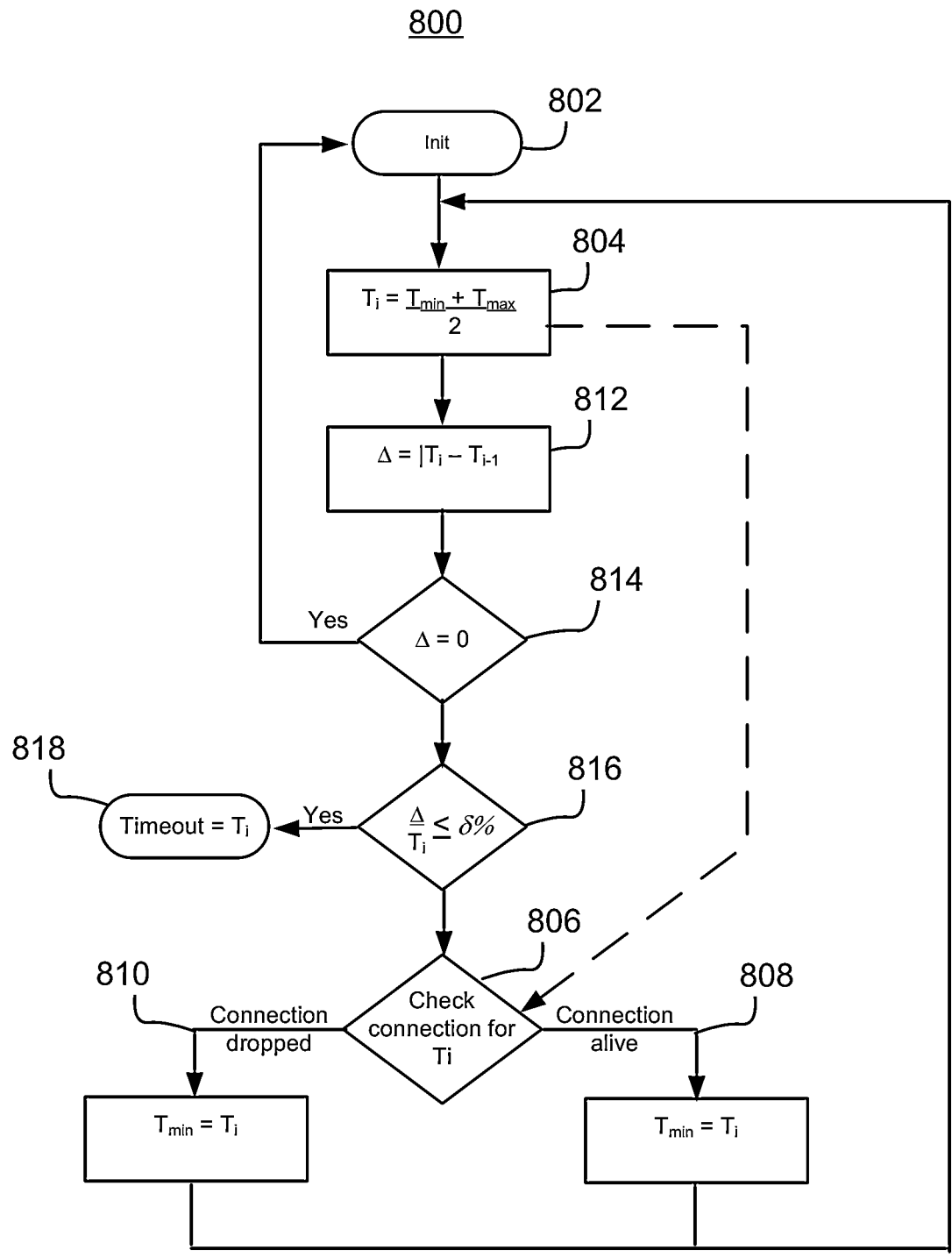
FIG. 8 illustrates one embodiment of a flowchart of operations consistent with the present disclosure for determining a timeout interval Ti.

Turning now to FIG. 8, one embodiment illustrating a flowchart 800 of operations of the binary search methodology to determine a timeout Ti is generally illustrated. The methodology starts by initializing the maximum and the minimum values for the timeout ($T_{max}$ and $T_{min}$) and the current timeout is initialized to the minimum (operation 802). For example, the maximum $T_{max}$ can be set at 2 hours (i.e., the TCP default session timeout) and the minimum $T_{min}$ can be set at 30 seconds (smallest NAT timeout). It should be appreciated, however, that the initial values of $T_{max}$ and/or $T_{min}$ may be selected based on other criterion such as, but not limited to, historical data/calculations and the like.

After initialization, Ti is set to a value between the maximum $T_{max}$ and minimum $T_{min}$ (operation 804) and the connection status is checked for the new timeout (operation 806). According to one embodiment, Ti may be set of a midrange value between $T_{max}$ and $T_{min}$; however, it should be appreciated that the value of Ti may be selected to be any value between $T_{max}$ and $T_{min}$. If the connection is still alive (operation 808), then the timeout Ti can be increased, for example, by increasing the minimum threshold $T_{min}$ to the current timeout Ti before looping again. If the connection is dropped (operation 810), then the timeout Ti has to be decreased, for example, by decreasing the maximum threshold $T_{max}$ to the current timeout Ti before looping again.

The method may be repeated for up to a maximum predetermined number of iterations and/or until two subsequent timeouts (e.g., Ti and Ti−1) are close enough in which the algorithm terminates with the correct timeout Ti. For example, the difference between two subsequent timeouts (e.g., Ti and Ti−1) may be determined (operation 812). If the difference is zero (operation 814), then the maximum $T_{max}$ and minimum $T_{min}$ may be reinitialized, and the method 800 may begin again. If the difference is not zero, then the difference may be compared (operation 816) to a threshold value (e.g., a percentage of the difference divided by the current value of Ti). If the difference is less than or equal to the threshold value, then the timeout is set to the current value of Ti at operation 818 (provided that the connection is maintained). If the difference is greater than the threshold value, then the connection status is checked (operation 806) as described herein.

By knowing the correct timeout Ti, the client platform 102 only needs to send one keep-alive message before the timeout occurs and hence only up every Ti seconds to send the keep-alive message whether offloaded in the NIC 220 or after waking up the client platform 102. The client platform 102 will be more energy-efficient as the value of Ti increases. This methodology may also be used to determine the values of both $T_S$ and $T_N$ as they differ on how to check the connection status and how to infer that a connection has been dropped as described herein.

(b) Determine Server Timeouts (TS) using Proprietary Keep-Alive Handshakes

As previously mentioned, $T_S$ represents the timeout of the remote application server side. This happens when the remote application server side has timed out and dropped the application session even though the network connection to the remote application server is open (e.g., server IP address is reachable through network requests like PING). As a result, the client platform 102 is no longer reachable (marked offline) from the remote application server 106. This case happens when the application-level keep-alive handshake has a shorter timeout than that of the network communication equipment 110.

Figure 9:
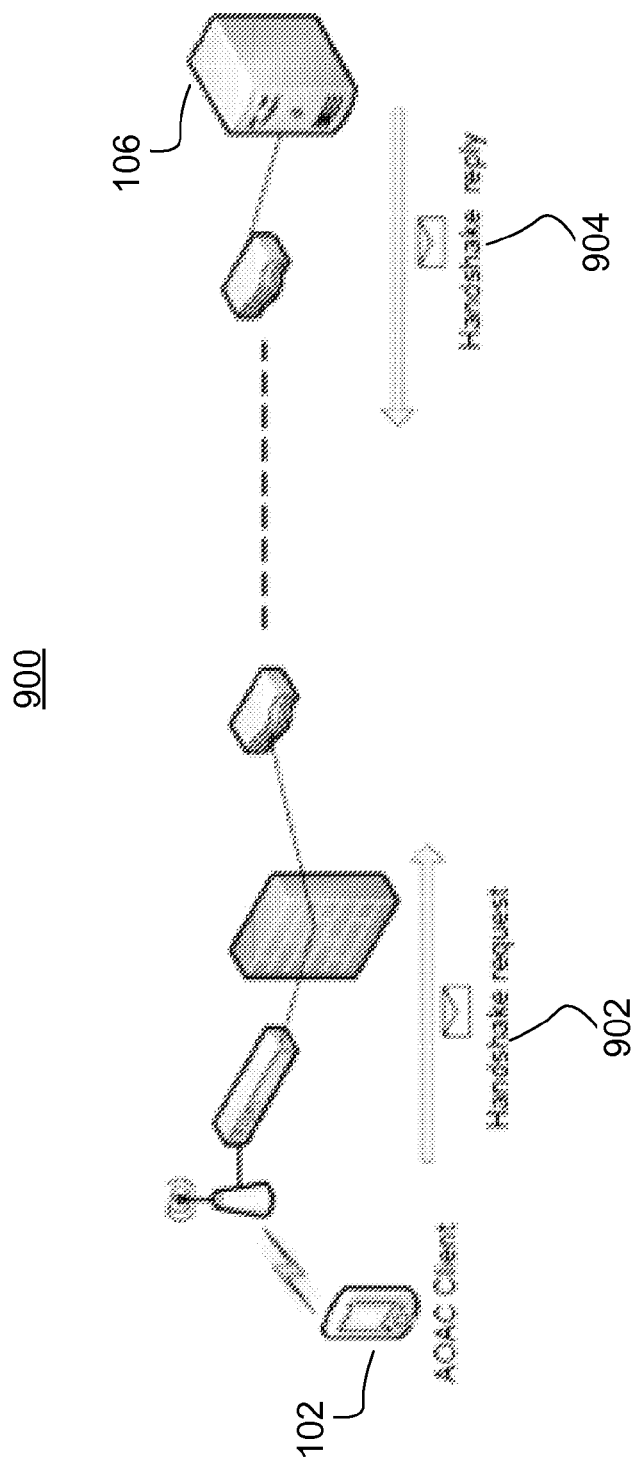
FIG. 9 illustrates one embodiment of a system for determining a connection timeout using a handshake reply consistent with the present disclosure.

Referring now to FIG. 9, one embodiment of a system 900 for determining a connection timeout using a handshake reply is generally illustrated. In particular, a client platform 102 sends an application level handshake request 902 to a remote application server 106. If the remote application server 106 has not timed out the application session, the remote application server 106 should send back a handshake reply 904 and reset the timer. The client platform 106 can send a handshake request 902 every Ti and if it gets a reply using this interval, then this indicates that the connection is alive for the timeout of Ti and a new larger value is to be determined as described herein, for example, with respect to FIG. 8.

On the other hand, if a handshake request 902 is transmitted at timeout interval Ti, and a handshake reply 904 is not received at the client platform 102, this indicates that the remote application server 106 has dropped the application session (i.e., the request is timed out) and a new smaller value for Ti is to be determined, for example, as described in FIG. 8.

The client platform 102 cannot just simply resend the handshake keep-alive request 902 with an updated interval Ti, instead the client platform 102 has to first re-establish the application session (i.e. re-entry to the network) with the remote application server 106 each time an application session was dropped. While this method relies on a proprietary handshake, the method could be valuable for end-to-end services differentiations like using Intel AppUp server to push content, maintain application sessions with Intel's clients.

(c) Determine Server Timeouts (TS) using Concurrent Connection

In some AOAC applications (for example, some HTTP-based push for updates), the remote application server might not require the application session to be alive for sending the keep-alive reply; instead it treats all handshake-requests as an "add-client" request. If the client platform is active, it will reset the session timeout before sending the reply and if not, it will first add the client platform to the set of active clients, reset the timeout, and then send the reply. In this case using the proprietary keep-alive handshakes to determine that a session is dropped may not work because even the network connection is dropped, a new network connection will be re-established based on sending a new keep-alive request.

Figure 10:
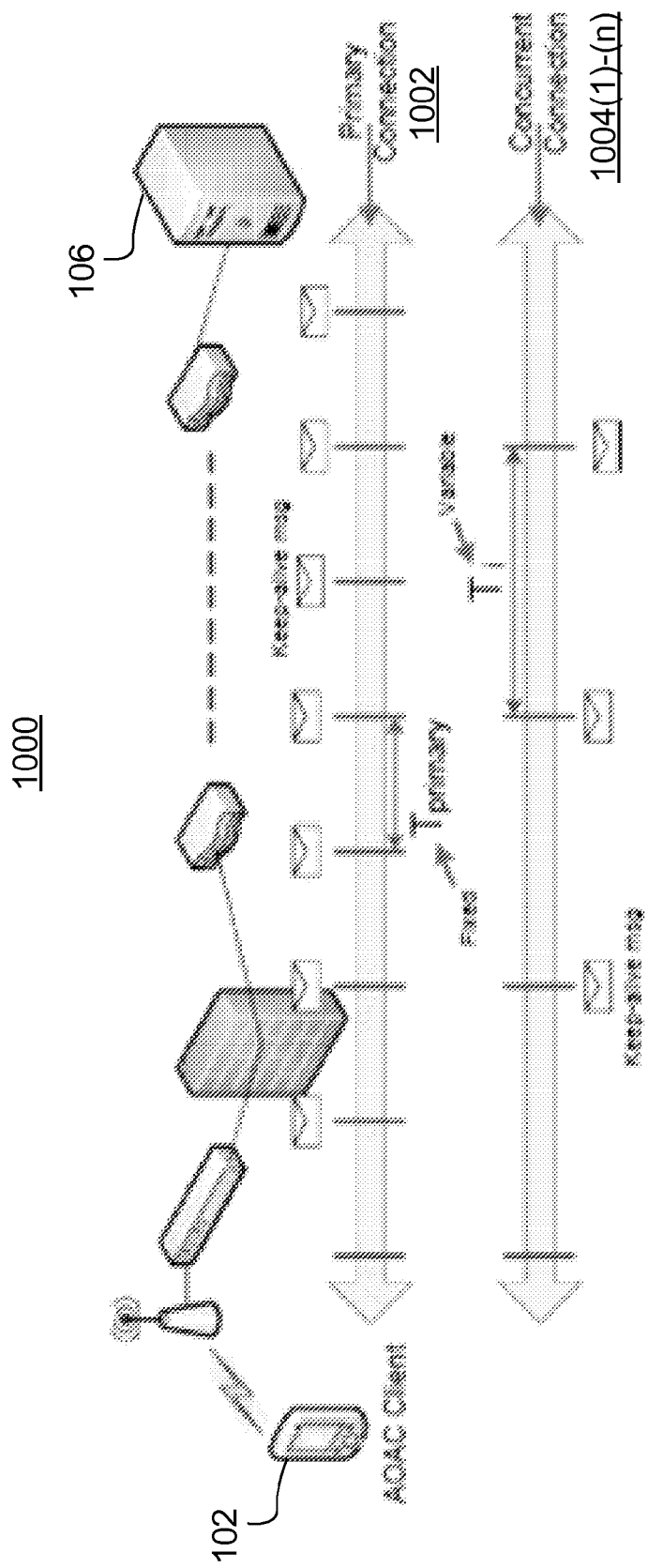
FIG. 10 illustrates one embodiment of a system for determining a connection timeout using concurrent connections consistent with the present disclosure.

To address this case, the present disclosure may utilize concurrent connections as generally illustrated in the system 1000 shown in FIG. 10. In particular, the system 1000 may include multiple connections running between the client platform 102 and the server 106, e.g., a primary connection 1002 and one (or more) concurrent connection 1004(1)-(n). On the primary connection, the default working keep-alive timeout $T_{primary}$ is used to connect the client platform 102 to the remote application server 106. The default timeout $T_{primary}$ may be fixed and may always be used until the optimal timeout is determined on the concurrent connection 1004(1)-(n).

On the concurrent connection 1004(1)-(n), a variable timeout (Ti) may be used. The optimal timeout may be determined as described herein, for example, with respect to FIG. 8, that is, if the concurrent connection 1004(1)-(n) is dropped, Ti will decrease and if it is still alive, Ti will increase until it converges to the optimal with the required accuracy. The AOAC application may induce the information of whether the concurrent connection 1004(1)-(n) is dropped versus alive by comparing the data received on the primary connection 1002 and the concurrent connection 1004(1)-(n). If some data update is received on the primary connection 1002 and not on the concurrent connection 1004(1)-(n), then this indicates that the concurrent connection 1004(1)-(n) is dropped and if the same updates are received on both connections 1002, 1004(1)-(n), this indicates that the concurrent connection 1004(1)-(n) is alive.

By way of example, any status update from the remote application server 106 that is received on the primary connection 1002 by the client platform 102 and not received on the concurrent connection 1004(1)-(n) indicates that the concurrent connection 1004(1)-(n) is dropped. For example, if remote application server 106 is a mail server and an indication of new mail is sent to the client platform 102 when new mail arrives, then the indication of new mail should be received on the primary connection 1002. If the new mail indication is received on the concurrent connection 1004(1)-(n), then the concurrent connection 1004(1)-(n) is alive, if it is not received, then the concurrent connection 1004(1)-(n) is dead. By monitoring and comparing data received on the primary 1002 versus the concurrent ones 1004(1)-(n), the client platform 102 can induce which of the concurrent connections is dead.

While the present disclosure describes the systems and methods using two concurrent connections, it can easily be extended to multiple (more than 2) connection running in parallel each running at a different timeout value and as the number of concurrent connections increase the convergence time to the optimal timeout value will be faster.

(d) Determine Connection Timeout ($T_N$) using Active Probing

As described herein, $T_N$ represents the minimum timeout of any communication equipment (e.g., Network Address Translation "NAT" box) along the communication path from the client platform to the remote application server. When $T_N$ expires, the network pipe is "blocked", even though the remote application server still maintains the session and client state but the client platform is no longer reachable by the remote application server.

A client platform initiated handshake request cannot be used to determine $T_N$ as it would refresh and re-open the network pipe (e.g., NAT device will insert new entry for the client port in its cache). As a result, the connection timeout is tested using a server initiated handshake (i.e., outside-in), which may be referred to as active probing (active because it requires the active participation of the AOAC remote application server).

Figure 11:
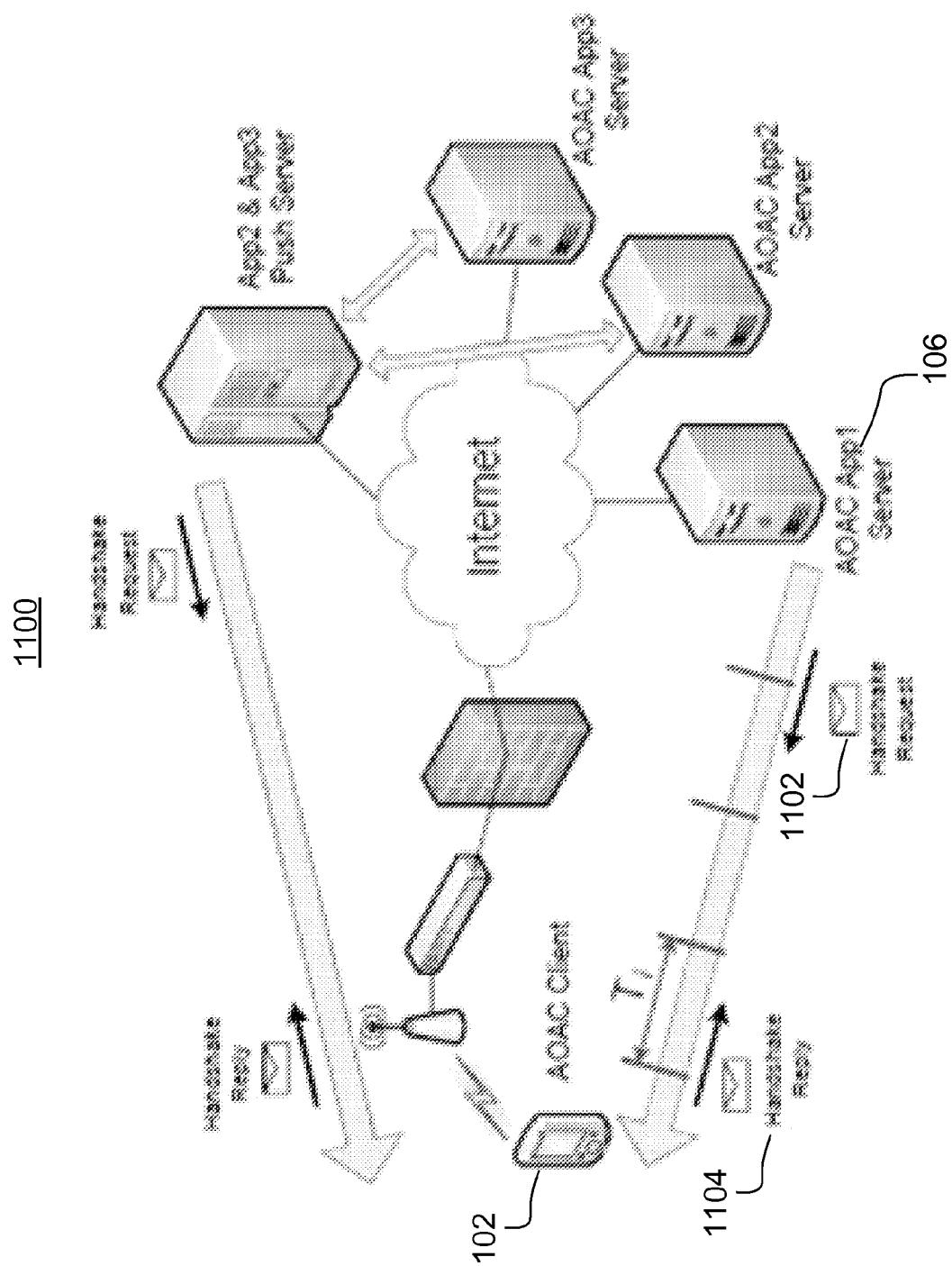
FIG. 11 illustrates one embodiment of a system for determining a connection timeout using active probing consistent with the present disclosure.

Turning now to FIG. 11, one embodiment of a system 1100 for determining the connection timeout using active probing is generally illustrated. In particular, the remote application server 106 (e.g., AOAC APP1 server in FIG. 11) may be configured to send handshake requests 1102 every timeout $T_i$ destined to the client platform 102, and receive a handshake reply 1104 from the client platform 102 indicating that the network pipe is open. $T_i$ may then be increased as described in FIG. 8. If no handshake reply 1104 is received at the remote application server 102, this indicates that the network pipe is blocked. As such, the client platform 102 not receiving the handshake request 1102 for Ti will timeout and will reestablish the connection afterwards. The remote application server 106 not receiving a handshake reply 1104 at Ti will determine that a new, smaller timeout value for Ti has to be used, and will wait until the client platform 102 reestablishes the connection with the remote application server 106 before trying the smaller value of Ti, for example, as described in FIG. 8.

AOAC push servers (such as, but not limited to, Apple Push Notification Service (APNS)™ and the Intel AppUp push Server™) aggregate data updates from different application servers (for example, but not limited to, APNS will aggregate email updates, Facebook™ updates, Linkedin™ updates, etc.) to optimize transmission to the client platform 102. In these embodiments, the push server may determine the network timeout $T_N$ to the client platform as described herein. It should be noted that whether the server acts as a data aggregator or not, the server can participate in the active probing by sending handshake requests to the client which will reply with handshake replies as described.

(e) Determine Connection Timeout ($T_N$) using Passive Listening

To discover $T_N$, the client platform can also use "Passive Listening." The system and method only requires changes to the client platform; however, passive listening may have a slower convergence time to find the optimum keep-alive period. As described herein, Passive Listening does not require any cooperation from the push server.

Figure 12:
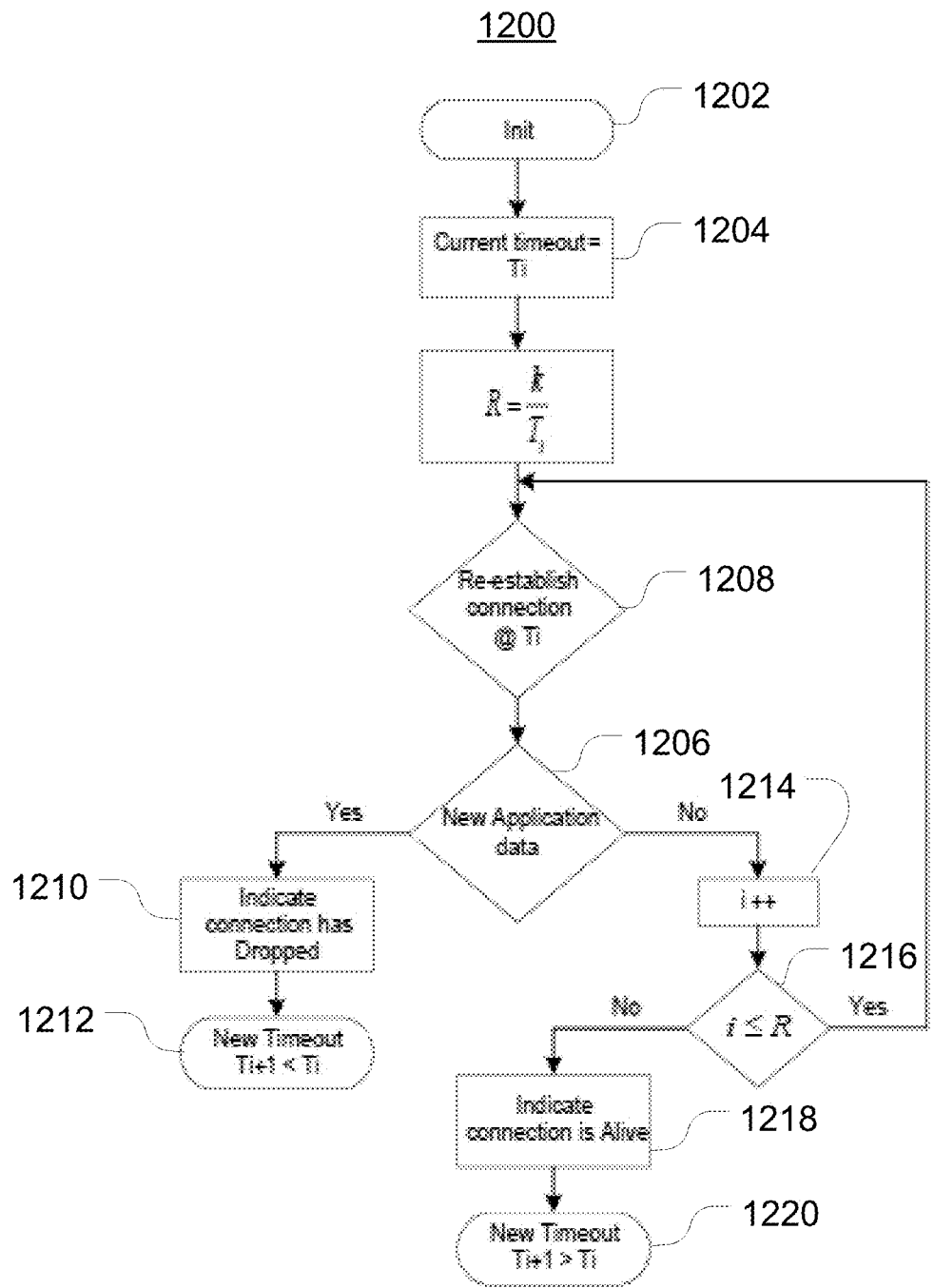
FIG. 12 illustrates one embodiment of a flowchart of operations consistent with the present disclosure for determining a timeout interval Ti using passive listening.

Turning to FIG. 12, one embodiment illustrating a flowchart 1200 of operations for determining a timeout Ti using passive listening is generally illustrated. The timeout Ti may be initialized, for example, to a default value or a value based on historical data (operation 1202) and the current timeout is set to Ti (operation 1204). The client platform may detect that the connection has timed out and has been dropped by passively monitoring data delivery failure (operation 1206). When the client platform is testing a keep-alive timeout value of Ti, instead of just sending a keep-alive message, the client platform re-establishes the connection every Ti (operation 1208) and new application data received will indicate that the connection has been already dropped (operation 1210). As such, a new and smaller value of Ti has to be tested (operation 1212), for example, as described in FIG. 8.

In contrast, if the client platform does not receive any new application data (operation 1214), this does not necessarily mean that the connection is alive and has not been dropped. For example, because receiving pushed data from the remote application server is data dependent, the remote application server might not have had any new data to send to the client platform during the last keep-alive period Ti. However, each time the connection is re-established with no new data being received increases the probability that the connection has not been blocked at this timeout.

By way of example, assuming that the AOAC application is an email application and the client platform is performing a passive listening approach with the email server, when the connection is dropped any new email received destined to the client platform will not be delivered (pushed) to the client platform and only when the client platform re-connects back to the remote application server will the new email be delivered. When the client platform connects to the remote application server, if it finds a new email that has not been delivered, then the client platform may determine that Ti is large and should be decreased. On the other hand, if the client platform connects to the remote application server and finds no new emails, then the client platform is not sure whether the connection was dropped or not because the connection could have been dropped but no new email has arrived and hence the remote application server did not try to contact the client platform. However, with every time the client platform connects and no new email is there, then the confidence that the connection is alive increases. If the client platform connects, for example 1000 times, at the value Ti to the remote application server and each time there is no new email, then the client platform may become very confident that Ti is not large.

The client platform will keep testing the current Ti until enough confidence has been achieved that the connection is alive (operations 1216 and 1218). The confidence value depends on the application. For example, the more "chatty" the AOAC application is, then the less number of trials is needed to establish confidence. For example, the larger the "friends list" in Facebook™, there is an increased likelihood that more data and updates are expected. In contrast, if only have one friend is listed in the "friends list" in Facebook™, then there is a low probability that each time you connect to the remote application server there is a new update/message from this friend. Accordingly, confidence may be proportional to expected update rate of the application. If the AOAC application is expected to have a lot of updates and it connects and finds no updates, then the probability that the connection is alive is high and fewer connection trials are needed to establish enough confidence.

Once confidence has been achieved, a longer value of Ti can be tested (operation 1220), for example, as described in FIG. 8. As a result, the convergence time may be slower.

As shown in FIG. 12, the number of testing times for each new connection timeout value is inversely proportional to Ti because as Ti increases the probability that new data should have been pushed by the server increases and as a result fewer times are needed to be checked. In particular, R represents the number of retrials for each Ti after which the client platform can claim that Ti is not too large and can be increased. R is therefore inversely proportional to Ti and K may be considered a constant of proportionality. As described herein, the number of retrials (and hence the values of R and K) may be AOAC application specific and may be related to the expected data update rate of the application.

New data received after connection reestablishment might be for example, an AOAC email client syncing up with the server and an email is downloaded which should have been pushed by the server or an IM client that receives an indication that a message has not been delivered because client was offline.

By way of example, an AOAC application (e.g., an AOAC email application) is checking with the email server every Ti whether you have an email or not. If Ti is short (for example, checking every 10 minutes), then the probability that the client platform has received an email during the previous 10 minutes is not very high and the client platform has to check multiple times (for example, check 100 times) before the client platform is sure that Ti=10 minutes did not cause the connection to drop. On the other hand, if Ti is long (e.g., checking every 10 hours), then the probability that the client platform has received an email during the previous 10 hours are much higher. In this case, the client platform does not need to repeat the check as often. For example, checking 10 times (instead of 100 times) may be enough to establish the confidence. As explained herein, the number of retries (R and K) will depend on the AOAC application. For example, an email application may have much fewer updates compared to stocks. As a result, knowing the expected data update rate for an AOAC application may indicate how many retries are needed to build enough confidence.

(f) Re-Evaluating Timeout Values $T_N$ and Ti might have to be re-evaluated based on various conditions, e.g. a new AOAC application is added to the AOAC-enabled application list (i.e., begins executing on the client platform), the client platform is connected to a new network, etc. These are just few conditions which might lead to a re-evaluation of the time-out.

(2) Keep Alive Messages Alignment:

As discussed herein, the client platform may be configured to coalesce keep-alive messages to increase the energy efficiency of the client platform (e.g., the NIC). The client platform may include a transmission agent configured to align the transmission of keep-alive messages from two or more AOAC applications as one burst, where the time between two bursts is equal to the minimum keep-alive period of an AOAC application X. As such, the client platform may remain in the low-power state for the time between two bursts.

Figures 13A, 13B:
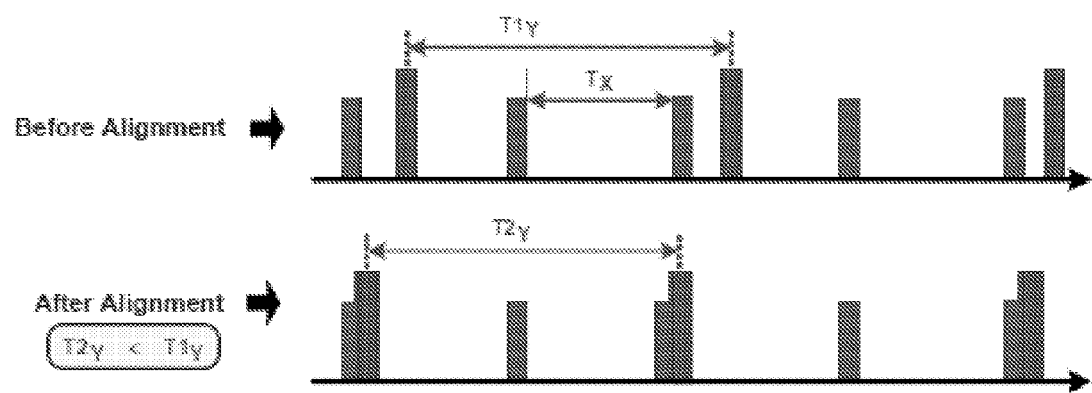
FIGS. 13A and 13B illustrate one embodiment for aligning the transmission of keep-alive messages from a plurality of AOAC applications consistent with the present disclosure.

With reference to FIGS. 13A and 13B, assuming AOAC application Y has a keep-alive timeout $T1_Y$ (and without loss of generality) $T1_Y$ is larger than the minimum keep-alive timeout Tx associate with AOAC application X, the periodicity of AOAC application Y (i.e., $P_Y$) can be defined as:

$$P_Y = T1_Y / Tx$$

The transmission agent of the client platform may then send a keep-alive message for AOAC application Y every new timeout period $T2_Y$, where $T2_Y = P_Y \cdot TX$. As a result, the keep-alive messages of all the AOAC applications may be aligned to multiple periods of the minimum timeout of AOAC application X. Consequently, the client platform may enter a low-power state for the duration of TX.

It should be noted that the new derived timeout value of any AOAC application will always be smaller than or equal to its original timeout value. Hence, sending keep-alive messages at the new rate will always guarantee that AOAC client platform for this AOAC application will be connected to the remote application server.

Accordingly, one embodiment of the present disclosure features systems for adaptively determining a minimum/optimum timeout value for the keep-alive messages independent from the network topology used (e.g., with and/or without network communication devices such as. The systems may also maximize time between wakeups of the client platform by maximizing the time between transmissions of keep-alive messages and coalescing the transmissions. As a result, the client platform may maintain the connectivity with the remote application server(s) while increasing the overall energy efficiency of the client platform (which may therefore increase battery life). The systems may re-evaluate the connectivity parameters whenever the client platform changes networks or an application error is detected. As a result, the AOAC application(s) can maintain connectivity to the remote application server(s) transparently from the user, irrespective of where the client platform is located, the type of network (e.g., wireless, wired, etc.) used, or the location of the network (e.g., home, work hot spot, etc.).

In one aspect, the client platform may (e.g., the NIC and/or the connection agent) may dynamically maintain application/service presence with the remote application server(s) by dynamically detecting the maximum period of keep-alive handshakes, including detecting network changes to adapt the period of the keep-alive messages. The client platform may (e.g., the NIC and/or the connection agent) may dynamically detect the maximum period of keep-alive handshakes using proprietary keep-alive handshakes, concurrent connections, active probing, and/or passive listening. The client platform may (e.g., the NIC and/or the connection agent) may also align transmitted keep-alive messages from multiple AOAC applications to maximize the duration in which the client platform stays in a low-power state.

According to one aspect, the present disclosure features a method for determining a timing interval Ti. The method includes selecting a value for the timeout (Ti) to a value between a maximum timeout ($T_{max}$) and a minimum timeout ($T_{min}$); transmitting a keep-alive message, at an interval based on Ti, across a network connection between a client platform running an Always-On-Always-Connected (AOAC) application and a remote application server associated with the AOAC application; checking a status of the network connection; increasing the value for $T_{min}$ if the network connection is still active; and decreasing the value for $T_{max}$ if the network connection has been dropped.

According to another aspect, the present disclosure features a computer readable non-transitory medium having instructions stored thereon, the instruction when executed by a processor cause the processor to transmit a keep-alive message, at an interval based on a value for a timeout (Ti), across a network connection between a client platform running an Always-On-Always-Connected (AOAC) application and a remote application server associated with the AOAC application, wherein Ti has a value between a maximum timeout ($T_{max}$) and a minimum timeout ($T_{min}$); check a status of the network connection; increase the value for $T_{min}$ if the network connection is still active; and decrease the value for $T_{max}$ if the network connection has been dropped.

According to yet another aspect, the present disclosure features a client platform system including a host system configured to operate in a first power state and a low-power state, a Network Interface Card (NIC) configured to establish a communication link between the host system and an associated remote application server, and memory. The host system is configured to execute at least one Always-On-Always-Connected (AOAC) application while in the first power state. The NIC is configured transmit keep-alive messages at a timeout interval Ti to the remote application server while the host remains in the low-power state. The keep-alive messages are configured to maintain connectivity and presence of the AOAC application with the remote application server while the host system is in the low-power state. The memory is configured to store the keep-alive messages and accessible to the NIC while the host system remains in the low-power state. The client platform system is further configured to iteratively determine the timeout interval Ti while the client platform system is in the first power state by transmitting keep-alive messages, at an interval based on a value for a timeout (Ti), across a network connection between the client platform and the remote application server, wherein Ti has a value between a maximum timeout ($T_{max}$) and a minimum timeout ($T_{min}$); checking a status of the network connection; increasing the value for $T_{min}$ if the network connection is still active; decreasing the value for $T_{max}$ if the network connection has been dropped; and repeating the previous steps for either up to a maximum predetermined number of iterations or until a difference between two subsequent values for Ti is within a threshold value.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A computer implemented method, comprising:
a. selecting a value for a timeout (Ti) to a value between a maximum timeout ($T_{max}$) and a minimum timeout ($T_{min}$);
b. transmitting a keep-alive message, at an interval based on Ti, across a network connection between a client platform running an Always-On-Always-Connected (AOAC) application and a remote application server associated with said AOAC application;
c. checking a status of said network connection;
d. increasing said value for $T_{min}$ if said network connection is still active; and
e. decreasing said value for $T_{max}$ if said network connection has been dropped.

2. The method of claim 1, further comprising repeating (a)-(e) for up to a maximum predetermined number of iterations or until a difference between two subsequent values for Ti is within a threshold value.

3. The method of claim 2, further comprising establishing a new network connection status between said client platform and said remote application server if said previous network connection has been dropped.

4. The method of claim 2, further comprising initializing a value for $T_{max}$ and a value for $T_{min}$, wherein said initial value of $T_{max}$ is based on either a TCP default session timeout or historical data associated with said network connection, and wherein said initial value of $T_{min}$ is based on a Network Address Translation (NAT) device timeout or historical data associated with said network connection.

5. The method of claim 4, wherein increasing said value for $T_{min}$ if said network connection is still active comprises increasing $T_{min}$ to the current timeout Ti; and wherein decreasing said value for $T_{max}$ if said network connection has been dropped comprises decreasing $T_{max}$ to the current timeout Ti.

6. The method of claim 1, wherein said status of said network connection is checked based on whether said client platform receives a handshake reply from said remote application server.

7. The method of claim 1, further comprising:
establishing a primary network connection between said client platform and said remote application server;
establishing at least one concurrent network connection between said client platform and said remote application server;
wherein said keep-alive message in step (b) is transmitted across said at least one concurrent network connection; and
wherein said checks said status of said at least one concurrent network connection in step (c) by comparing data received on said primary network connection and data received on said at least one concurrent network connection.

8. The method of claim 7, further comprising:
establishing a plurality of concurrent connections running in parallel, each of said plurality of concurrent connections operating at a different timeout values.

9. The method of claim 7, further comprising transmitting keep-alive messages across said primary network connection using a default working keep-alive timeout $T_{primary}$, said default timeout $T_{primary}$ fixed until a final value for Ti is determined on said at least one concurrent network connection.

10. The method of claim 1, wherein said keep-alive message in step (b) is transmitted across said network connection from said remote application server to said client platform every timeout Ti.

11. The method of claim 10, further comprising:
increasing Ti if said at said remote application server receives a handshake reply from said client platform; and
decreasing Ti if said at said remote application server does not receive a handshake reply from said client platform.

12. A computer readable non-transitory medium having instructions stored thereon, the instruction when executed by a processor cause the processor to:
a. transmit a keep-alive message, at an interval based on a value for a timeout (Ti), across a network connection between a client platform running an Always-On-Always-Connected (AOAC) application and a remote application server associated with said AOAC application, wherein Ti has a value between a maximum timeout ($T_{max}$) and a minimum timeout ($T_{min}$);
b. check a status of said network connection;
c. increase said value for $T_{min}$ if said network connection is still active; and
d. decrease said value for $T_{max}$ if said network connection has been dropped.

13. The medium of claim 12, further comprising instructions to repeat (a)-(d) for up to a maximum predetermined number of iterations or until a difference between two subsequent values for Ti is within a threshold value.

14. The medium of claim 12,
wherein increasing said value for $T_{min}$ if said network connection is still active comprises instructions to increase $T_{min}$ to the current timeout Ti; and wherein decreasing said value for $T_{max}$ if said network connection has been dropped comprises instructions to decrease $T_{max}$ to the current timeout Ti.

15. The medium of claim 12, wherein said status of said network connection is checked based on whether said client platform receives a handshake reply from said remote application server.

16. The medium of claim 12, further comprising instructions to:
establish a primary network connection between said client platform and said remote application server;
establish at least one concurrent network connection between said client platform and said remote application server;
wherein said keep-alive message of (a) is transmitted across said at least one concurrent network connection; and
wherein checking said status of said network connection comprises checking said at least one concurrent network connection of (b) by comparing data received on said primary network connection and data received on said at least one concurrent network connection.

17. The medium of claim 16, further comprising instructions to:
establish a plurality of concurrent connections running in parallel, each of said plurality of concurrent connections operating at a different timeout values.

18. The medium of claim 16, further comprising instructions to transmit keep-alive messages across said primary network connection using a default working keep-alive timeout $T_{primary}$, said default timeout $T_{primary}$ fixed until a final value for Ti is determined on said at least one concurrent network connection.

19. The medium of claim 12, wherein said keep-alive message of (b) is transmitted across said network connection from said remote application server to said client platform every timeout Ti.

20. The medium of claim 19, further comprising instructions to:
increase Ti if said at said remote application server receives a handshake reply from said client platform; and
decrease Ti if said at said remote application server does not receive a handshake reply from said client platform.

21. A client platform system, comprising:
a host system configured to operate in a first power state and a low-power state, said host system further configured to execute at least one Always-On-Always-Connected (AOAC) application while in said first power state;
circuitry configured to establish a communication link between said host system and an associated remote application server, said circuitry further configured to transmit keep-alive messages at a timeout interval Ti to said remote application server while said host remains in said low-power state, said keep-alive messages configured to maintain connectivity and presence of said AOAC application with said remote application server while said host system is in said low-power state; and
memory configured to store said keep-alive messages, said memory configured to be accessible to said NIC while said host system remains in said low-power state,
wherein said client platform system is further configured to iteratively determine said timeout interval Ti while said client platform system is in said first power state by:
a. transmitting keep-alive messages, at an interval based on a value for a timeout (Ti), across a network connection between said client platform and said remote application server, wherein Ti has a value between a maximum timeout ($T_{max}$) and a minimum timeout ($T_{min}$);
b. checking a status of said network connection;
c. increasing said value for $T_{min}$ if said network connection is still active;
d. decreasing said value for $T_{max}$ if said network connection has been dropped; and
repeating (a)-(d) for up to a maximum predetermined number of iterations or until a difference between two subsequent values for Ti is within a threshold value.

22. The system of claim 21,
wherein increasing said value for $T_{min}$ if said network connection is still active comprises increasing $T_{min}$ to the current timeout Ti; and
wherein decreasing said value for $T_{max}$ if said network connection has been dropped comprises decreasing $T_{max}$ to the current timeout Ti.

* * * * *

UNITED STATES PATENT AND TRADEMARK OFFICE
CERTIFICATE OF CORRECTION

PATENT NO. : 8,566,625 B2
APPLICATION NO. : 13/175778
DATED : October 22, 2013
INVENTOR(S) : Sameh Gobriel et al.

Page 1 of 2

It is certified that error appears in the above-identified patent and that said Letters Patent is hereby corrected as shown below:

On the Title page, in Item (74), in column 2, in "Attorney, Agent or Firm", line 2, delete "Pflger" and insert -- Pfleger --, therefor.

In the Drawings
On sheet 2 of 13, in Figure 2, delete

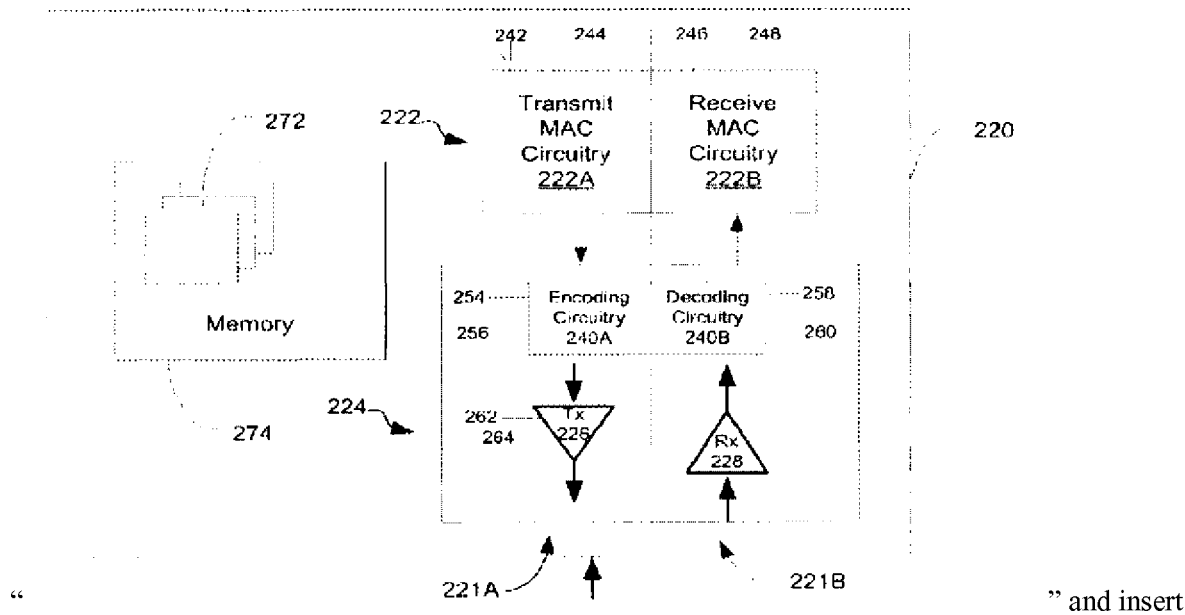

" and insert

Signed and Sealed this
Twenty-fifth Day of March, 2014

Michelle K. Lee
*Deputy Director of the United States Patent and Trademark Office*

CERTIFICATE OF CORRECTION (continued)
U.S. Pat. No. 8,566,625 B2

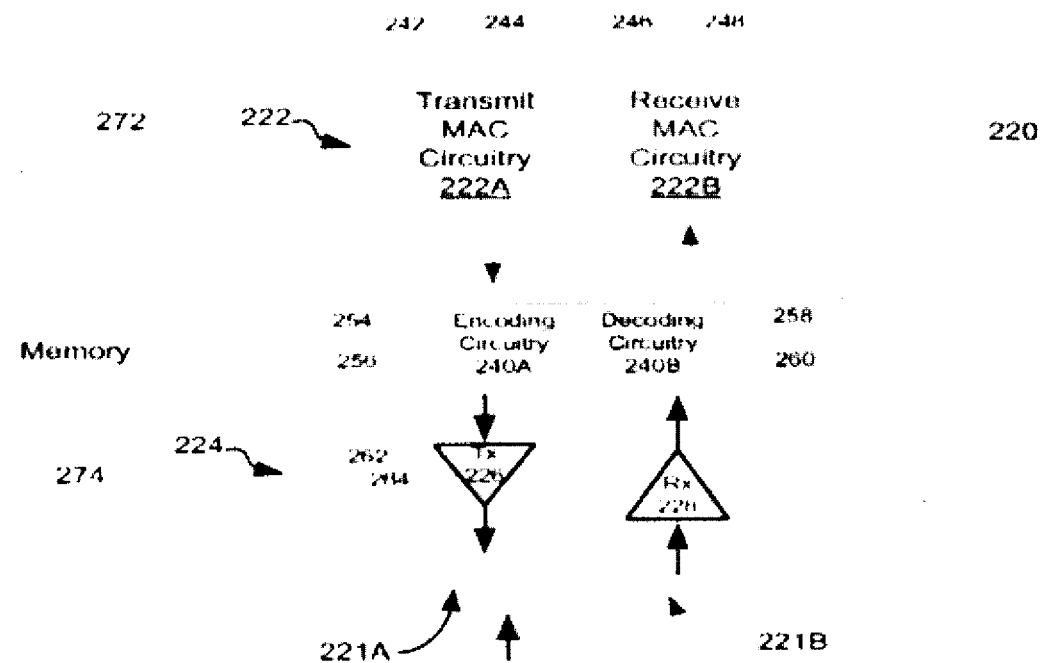

-- therefor.     --,